US007895646B2

(12) United States Patent
Cates et al.

(10) Patent No.: US 7,895,646 B2
(45) Date of Patent: Feb. 22, 2011

(54) IKE DAEMON SELF-ADJUSTING NEGOTIATION THROTTLE

(75) Inventors: Jeffrey B. Cates, Raleigh, NC (US); Wuchieh J. Jong, Raleigh, NC (US); Scott C. Moonen, Holly Springs, NC (US); Keith J. Welter, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 11/420,324

(22) Filed: May 25, 2006

(65) Prior Publication Data

US 2007/0277232 A1 Nov. 29, 2007

(51) Int. Cl.
*H04L 29/00* (2006.01)

(52) U.S. Cl. ............ 726/6; 726/5; 726/7; 726/13; 726/14

(58) Field of Classification Search ............ 726/5, 726/6, 7, 13, 14
See application file for complete search history.

(56) References Cited

U.S. PATENT DOCUMENTS

| | | | | |
|---|---|---|---|---|
| 5,359,593 A * | 10/1994 | Derby et al. | ............ | 370/234 |
| 5,559,798 A * | 9/1996 | Clarkson et al. | ............ | 370/468 |
| 5,687,235 A | 11/1997 | Perlman et al. | | |
| 6,526,448 B1 | 2/2003 | Blewett | | |
| 6,668,282 B1 | 12/2003 | Booth, III et al. | | |
| 6,904,529 B1 * | 6/2005 | Swander | ............ | 726/14 |
| 7,007,103 B2 * | 2/2006 | Pinkerton et al. | ............ | 709/238 |
| 7,162,630 B2 * | 1/2007 | Sperry et al. | ............ | 713/153 |
| 7,171,489 B2 * | 1/2007 | Pinkerton et al. | ............ | 709/238 |
| 7,577,161 B2 * | 8/2009 | Li et al. | ............ | 370/468 |
| 7,600,131 B1 * | 10/2009 | Krishna et al. | ............ | 713/192 |
| 7,602,709 B1 * | 10/2009 | Cheng et al. | ............ | 370/230 |
| 2002/0046348 A1 | 4/2002 | Brustoloni | | |
| 2002/0184487 A1 | 12/2002 | Badamo et al. | | |
| 2003/0074584 A1 * | 4/2003 | Ellis | ............ | 713/201 |
| 2005/0102529 A1 * | 5/2005 | Buddhikot et al. | ............ | 713/200 |
| 2005/0235356 A1 | 10/2005 | Wang | | |
| 2005/0256975 A1 * | 11/2005 | Kaniz et al. | ............ | 709/250 |
| 2006/0031567 A1 * | 2/2006 | Aoki et al. | ............ | 709/235 |

FOREIGN PATENT DOCUMENTS

| | | |
|---|---|---|
| DE | 103 31 317 A1 | 1/2005 |
| JP | 61-023438 | 1/1986 |

OTHER PUBLICATIONS

Hubert et al; "Linux Advanced Routing & Traffic Control HOWTO"; 2002; pp. 1-134.*

Ciccarese et al., "An IPSec-Aware TCP PEP for Integrated Mobile Satellite Networks", 15th IEEE International Symposium, vol. 4, pp. 2362-2366, Sep. 5-8, 2004.

Sulander et al., "Flow-Based Fast Handover Method for Mobile IPv6 Network", Vihicular Technology Conference, vol. 5, pp. 2447-2451, May 17-19, 2004.

* cited by examiner

*Primary Examiner*—Carl Colin
(74) *Attorney, Agent, or Firm*—DeLizio Gilliam, PLLC

(57) ABSTRACT

A self-adjusting Internet Key Exchange (IKE) daemon negotiation throttle minimizes retransmission processing during Security Association (SA) negotiation requests. The self-adjusting IKE daemon receives a request for a new negotiation to be performed by a negotiation system; determines if the negotiation system is in congestion; and if the negotiation system is determined to be in congestion: determines if a token is available in a token bucket; and if a token is available in the token bucket, removes the token from the token bucket; and performs the new negotiation.

18 Claims, 4 Drawing Sheets

US 7,895,646 B2

IKE DAEMON SELF-ADJUSTING NEGOTIATION THROTTLE

BACKGROUND OF THE INVENTION

1. Field of the Invention

The present invention generally relates to network security, and more specifically relates to an Internet Key Exchange (IKE) daemon self-adjusting negotiation throttle for minimizing retransmission processing during Security Association (SA) negotiation requests.

2. Related Art

The Internet Key Exchange (IKE) daemon dynamically negotiates Security Associations (SAs) for secure communication, known as IPSecurity. The IKE daemon follows the Internet Security Association and Key Management Protocol (ISAKMP) as specified in RFC 2408. Although two IKE daemons communicate by sending across User Datagram Protocol (UDP) messages, the ISAKMP protocol specifies and uses retransmissions to provide reliability.

A problem occurs when the IKE daemon attempts to negotiate a large numbers of SAs. Each SA negotiation involves a number of message exchanges. When a large number of SAs are being negotiated in parallel, message congestion may keep the IKE daemon from handling message requests in a timely manner. Delays in IKE daemon processing may lead to message retransmissions from the peer, which further exacerbates the problem. The IKE daemon detects the retransmitted messages as "replays," since the message has already been received and processed. The additional work in processing replays in turn causes more retransmissions since the IKE daemon is congested and cannot process all the messages and send a reply quickly enough. This "snowball" effect continues until the IKE daemon is predominately performing useless work by examining retransmissions for messages already received. If unchecked, this could potentially lead to a program crash or consume all available operating system resources. Further, the IKE daemon is also sending out retransmissions to the IKE peer causing congestion for the IKE peer. This is a common problem that can occur when the IKE daemon is restarted, during machine outages, when rebooting, or when large numbers of clients require connections within a short period of time (e.g., large number of employees at a large company logging on at 8:00 AM).

A common solution to reduce the number of retransmissions is to include a backoff mechanism such as a binary exponential backoff mechanism. An example would be to send a retransmission after 5 seconds, 10 seconds, 20 seconds, and so on. While this may work to reduce retransmissions for a single SA negotiation, it does not help in cases where there are a large number of SA negotiations within a short interval of time. The initial retransmit interval for the backoff mechanism would likely be small and cause a large amount of retransmissions initially.

Accordingly, a need exists for a way to efficiently minimize the amount of retransmission processing and maximize the number of SA negotiations in a self-adjusting manner.

SUMMARY OF THE INVENTION

The present invention provides an Internet Key Exchange (IKE) daemon self-adjusting negotiation throttle for minimizing retransmission processing during Security Association (SA) negotiation requests. This helps to maximize the number of SA negotiations.

A first aspect of the present invention is directed to a method for reducing retransmission processing comprising: receiving a request for a new negotiation to be performed by a negotiation system; determining if the negotiation system is in congestion; and if the negotiation system is determined to be in congestion: determining if a token is available in a token bucket; and if a token is available in the token bucket, removing the token from the token bucket; and performing the new negotiation.

A second aspect of the present invention is directed to a system for reducing retransmission processing, comprising: a system for receiving a request for a new negotiation to be performed by a negotiation system; a system for determining if the negotiation system is in congestion; a system for determining if a token is available in a token bucket if the negotiation system is determined to be in congestion; a system for removing a token, if determined to be available, from the token bucket; and a system for performing the new negotiation.

A third aspect of the present invention is directed to a program product stored on a computer readable medium for reducing retransmission processing, the computer readable medium comprising program code for: receiving a request for a new negotiation to be performed by a negotiation system; determining if the negotiation system is in congestion; and if the negotiation system is determined to be in congestion: determining if a token is available in a token bucket; and if a token is available in the token bucket, removing the token from the token bucket; and performing the new negotiation.

A fourth aspect of the present invention is directed to a method for deploying an application for reducing retransmission processing, comprising: providing a computer infrastructure being operable to: receive a request for a new negotiation to be performed by a negotiation system; determine if the negotiation system is in congestion; and if the negotiation system is determined to be in congestion: determine if a token is available in a token bucket; and if a token is available in the token bucket, remove the token from the token bucket; and performing the new negotiation.

The illustrative aspects of the present invention are designed to solve the problems herein described and other problems not discussed

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
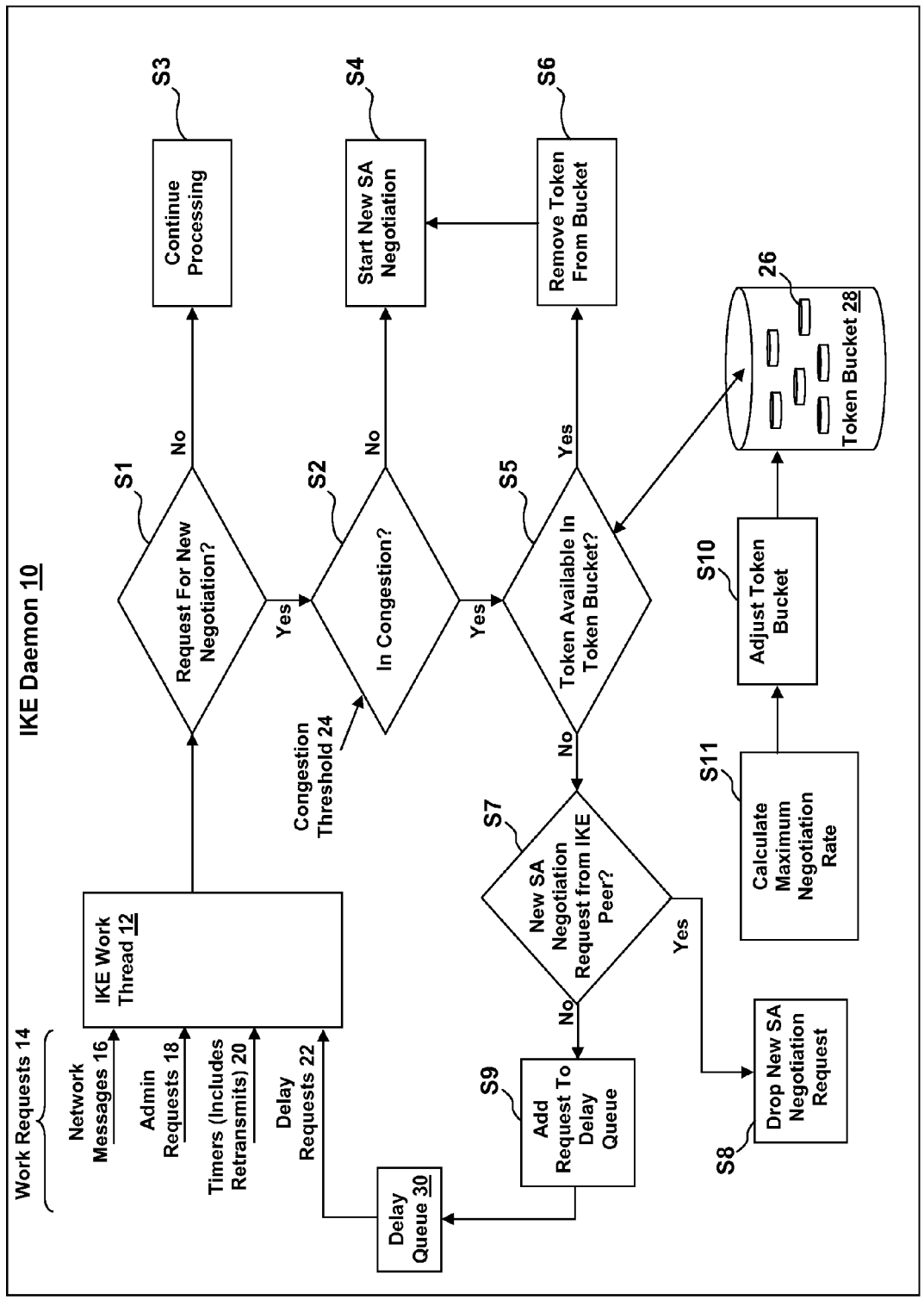
FIG. 1 depicts a representation of an Internet Key Exchange (IKE) daemon in accordance with an embodiment of the present invention.

A representation of an Internet Key Exchange (IKE) daemon methodology for minimizing retransmission processing during Security Association (SA) negotiation requests in accordance with an embodiment of the present invention is depicted in FIG. 1. The IKE daemon 10 includes an IKE work thread 12 that receives work requests 14. The work requests 14 can include, for example, network messages 16 (e.g., negotiation activity to/from IKE peers), administrative requests 18 (e.g., manual requests for SAs), and timers 20 (includes retransmits). The work requests 14 received by the IKE work thread 12 also include delay requests 22 from a delay queue 30.

When the IKE daemon 10 receives a network message 16, it first determines in step S1 whether the network message 16 comprises a new SA negotiation request. If so, flow passes to step S2. If the network message 16 is associated with an existing SA negotiation that is already being processed, then flow passes to step S3, where processing of the SA negotiation request continues.

In step S2, the IKE daemon 10 determines if it is in a "congestion" scenario. This is done by measuring the amount of time spent by the IKE daemon 10 in processing received network messages 16. For example, if the IKE daemon 10 spends more than a predetermined threshold of time 24 processing network messages 16, then the IKE daemon 10 is considered to be in congestion. The predetermined threshold of time 24, which is application/system specific, can be determined, for example, by examining the amount of time spent processing network messages 16 and determining the processing time at which congestion starts to occur.

If the IKE daemon 10 is not in congestion, then flow passes to step S4, where a new SA negotiation is started. Otherwise, flow passes to step S5, where the IKE daemon 10 determines if a token 26, which represents an SA negotiation that can be started, is available in a token bucket 28. If a token 26 is available in the token bucket 28, the token 26 is removed from the token bucket 28 in step S6 and a new SA negotiation is started in step S4. If no tokens 26 are available in the token bucket 28, then flow passes to step S7. If it is determined in step S7 that the new SA negation request was received from an IKE peer, then the new SA negotiation request is dropped in step S8. If not, in step S9 the new SA negotiation request is placed in a delay queue 30 for later processing (i.e., as a delay request 22). An IKE peer can retransmit a new SA negotiation request at a later time (e.g., in accordance with a retransmission timer) with the expectation that the IKE daemon 10 will have tokens 26 available in the token bucket 28.

The delay queue 30 provides a first-in first-out queue of new SA negotiation requests that have been delayed due to the congestion of the IKE daemon 10 (i.e., delay requests 22). The IKE daemon 10 processes the delay requests 22 in the delay queue 30 when tokens 26 are available in the token bucket 28. Delay requests 22 are given a lower priority and are processed after network messages 16 associated with SA negotiations that are currently being processed. When the tokens 26 in the token bucket 28 are depleted, the remaining delay requests 22 are kept on the delay queue 30 until a sufficient number of additional tokens 26 are added to the token bucket 28.

The IKE daemon 10 maintains a token bucket 28 for new SA negotiations. The maximum size (i.e., the maximum number of tokens 26) of the token bucket 28 is periodically self-adjusted in step S10 once per token adjust interval by the IKE daemon 10 based on a calculation of the maximum SA negotiation rate the IKE daemon 10 can handle. The token adjust interval is application specific and can vary from system to system. This calculation, performed in step S11, is based on the real-time measurement of (1) the number of network messages 16 per unit time (e.g., millisecond) processed by the IKE daemon 10 and (2) the number of network messages 16 received per SA negotiation. This calculation (1)/(2) determines the maximum number of SA negotiations per unit time the IKE daemon 10 can handle. If the maximum number of SA negotiations per unit time that can be handled by the IKE daemon 10 increases, then a number of tokens 26 are added to the token bucket 28. Tokens 26 are added to the token bucket 28 based on the maximum token bucket 28 size and the interval since tokens 26 were last added to the token. Similarly, if the maximum number of SA negotiations per unit time that can be handled by the IKE daemon 10 decreases, then a number of tokens 26 are removed from the token bucket 28. By controlling the flow of tokens 26 into and out of the token bucket 28, the IKE daemon 10 does not exceed the maximum number of SA negotiations per unit time it can handle, and the SA negotiations are completed as quickly as the IKE daemon 10 can start them. Under this policy, the number of retransmissions and replay processing are also greatly reduced.

Figure 2:
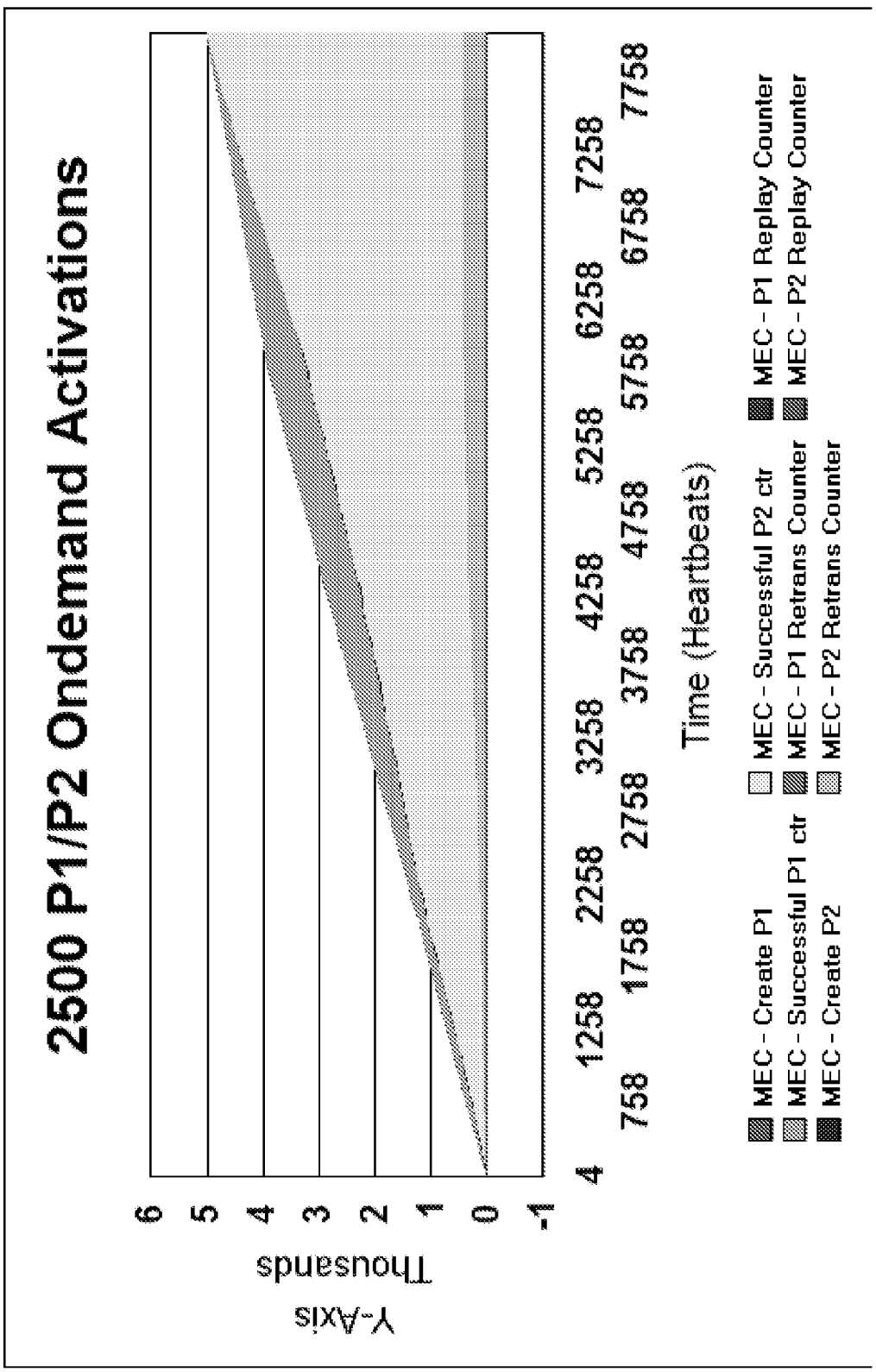
FIG. 2 depicts an illustrative graph of actual results showing how an IKE daemon in accordance with the present invention is capable of handling 2500 P1/P2 on-demand SA activations.

Prior to the present invention, fewer than a hundred simultaneous SA activations resulted in failed SA negotiations due to very large amounts of retransmit and replay processing activity. In accordance with the present invention, however, the IKE daemon 10 is able to handle a very large number of total SA negotiations (when negotiating at both ends). For example, FIG. 2 depicts a graph illustrating how a single IKE daemon in accordance with the present invention is capable of handling 2500 Phase 1 (P1)/Phase 2 (P2) on-demand SA activations (10,000 total). As can be seen in FIG. 2, the number of retransmissions is small compared to the number of completed SA negotiations. Without the throttling mechanism, the number of retransmissions would greatly outnumber the number of completed SA negotiations. It should also be noted that the rate of completion of SA negotiations (successful P1 counter and successful P2 counter) follows closely with the number of SA negotiations created (create P1 and create P2). This is difficult to see in FIG. 2 because the rate of SA completions closely mirrors the number of SA negotiations created. This indicates that the IKE daemon of the present invention is able to complete SA negotiations as quickly as it starts them.

Figure 3A:
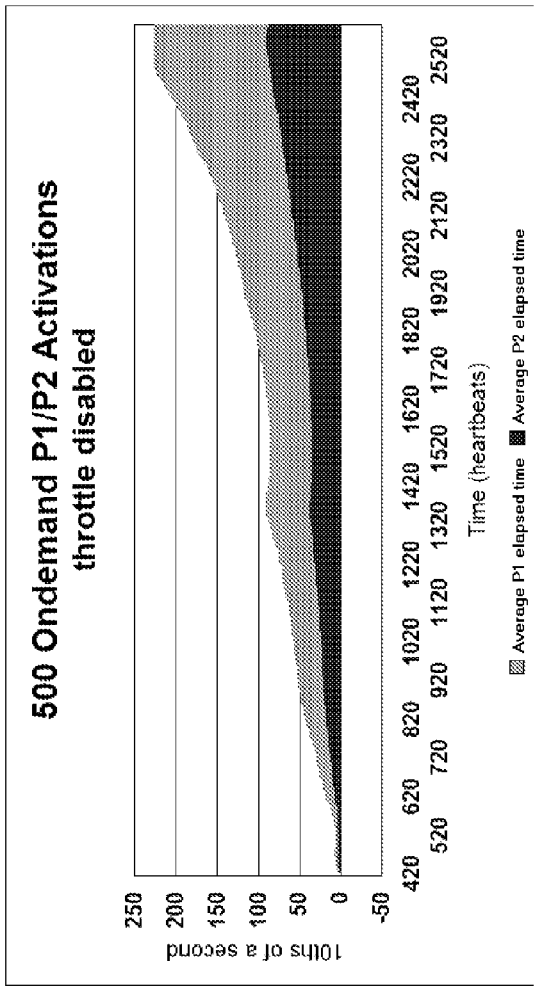
FIG. 3A depicts an illustrative graph of actual results showing the average length of time for an IKE daemon of the prior art to complete 500 P1 and P2 on-demand SA activations.
Figure 3B:
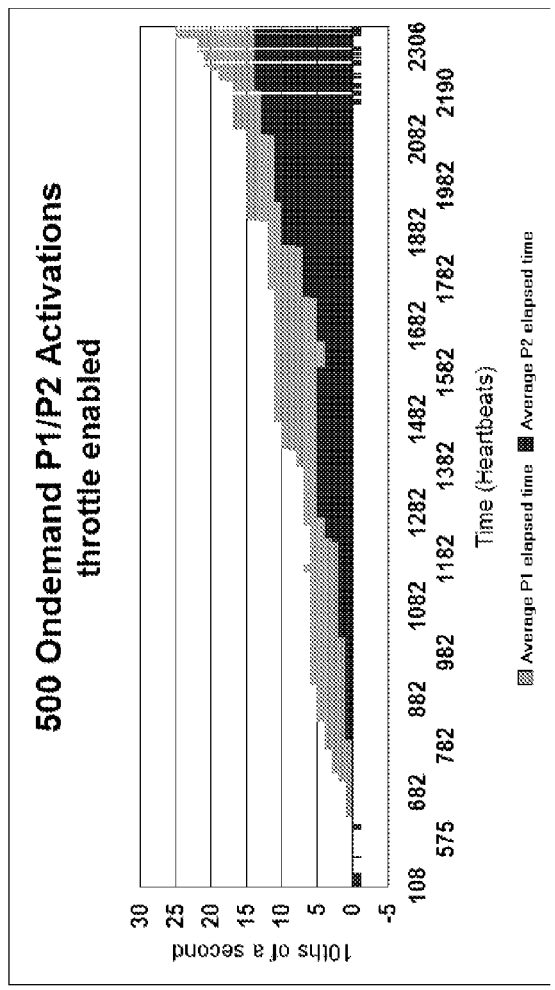
FIG. 3B depicts an illustrative graph of actual results showing the average length of time for an IKE daemon of the present invention to complete 500 P1 and P2 on-demand SA negotiations.

FIG. 3A depicts the average length of time for an IKE daemon of the prior art to complete 500 P1 and P2 on-demand SA activations. FIG. 3B depicts the average length of time for an IKE daemon of the present invention to complete 500 P1 and P2 on-demand SA activations. Comparing FIGS. 3A and 3B, it can be seen that there is an approximately 10-fold and 6-fold improvement in P1 and P2 SA activation times, respectively, when using an IKE daemon of the present invention. Although not shown, use of an IKE daemon of the present invention also results in a significant decrease in the amount of retransmit/replay processing. This indicates that the IKE daemon of the present invention is keeping up with the processing of SA negotiations.

Figure 4:
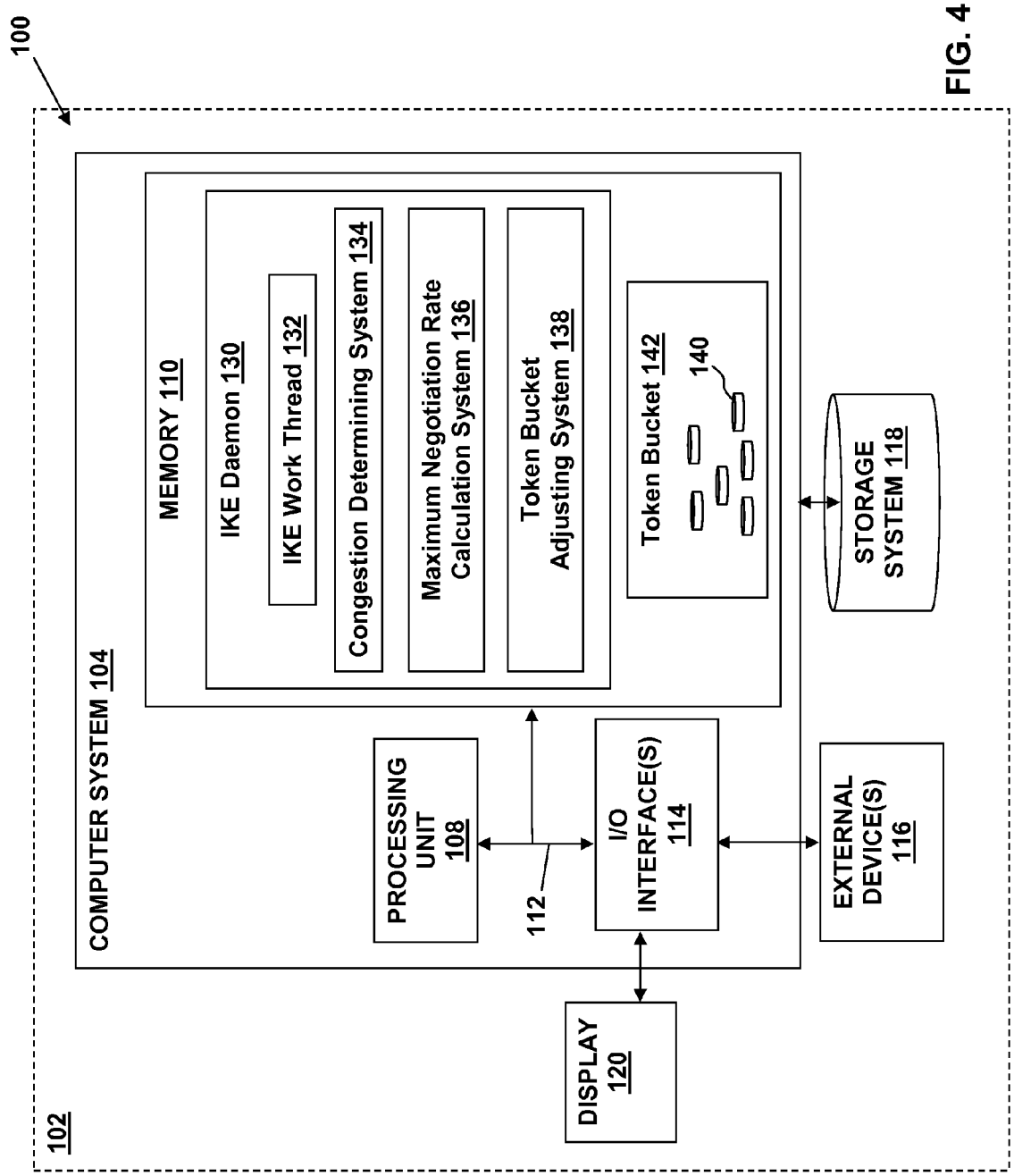
FIG. 4 depicts an illustrative computer system for implementing embodiment(s) of the present invention.

FIG. 4 shows an illustrative system 100 in accordance with embodiment(s) of the present invention. The system 100 includes a computer infrastructure 102 that can perform the various process steps described herein. In particular, the computer infrastructure 102 is shown as including a computer system 104 that comprises an IKE daemon 130, which enables the computer system 104 to minimize retransmission processing during SA negotiation requests by performing the process steps of the present invention.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as IKE daemon 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device 116 can comprise any device (e.g., display 120) that enables a user (not shown) to interact with the computer system 104 or any device that enables the computer system 104 to communicate with one or more other computer systems.

In any event, the computer system 104 can comprise any general purpose computing article of manufacture capable of executing computer program code installed by a user (e.g., a personal computer, server, handheld device, etc.). However, it is understood that the computer system 104 and the IKE daemon 130 are only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the IKE daemon 130 enables the computer system 104 to minimize retransmission processing during SA negotiation requests. To this extent, the IKE daemon 130 is shown as including an IKE work thread 132, a congestion determining system 134, a maximum negotiation rate calculation system 136, and a token bucket adjusting system 138 for adjusting the number of tokens 140 in a token bucket 142. The operation(s) carried out by each of these systems is discussed above. It is understood that some of the various systems shown in FIG. 4 can be implemented independently, combined, and/or stored in memory for one or more separate computer systems 104 that communicate over a network. Further, it is understood that some of the systems and/or functionality may not be implemented, or additional systems and/or functionality may be included as part of the system 100.

While shown and described herein as a method and system for minimizing retransmission processing during SA negotiation requests, it is understood that the invention further provides various alternative embodiments. For example, in one embodiment, the invention provides a computer-readable medium that includes computer program code to enable a computer infrastructure to minimize retransmission processing during SA negotiation requests. To this extent, the computer-readable medium includes program code, such as the IKE daemon 130, which implements each of the various process steps of the invention. It is understood that the term "computer-readable medium" comprises one or more of any type of physical embodiment of the program code, whether storage type or signal type. In particular, a computer-readable storage medium can comprise program code embodied on one or more portable storage articles of manufacture (e.g., a compact disc, a magnetic disk, a tape, etc.), and on one or more data storage portions of a computer system, such as the memory 110 and/or storage system 118 (e.g., a fixed disk, a read-only memory, a random access memory, a cache memory, etc.). A computer readable signal medium can comprise a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to provide an IKE daemon in accordance with the present invention. In this case, the service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method for minimizing retransmission processing during SA negotiation requests. In this case, a computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for reducing retransmission processing comprising:
   receiving a request for a new negotiation to be performed by a negotiation system,
      wherein the negotiation comprises a Security Association (SA) negotiation;
   determining if the negotiation system is in congestion; and
   if the negotiation system is determined to be in congestion:
      determining if a token is available in a token bucket; and
      if a token is available in the token bucket:
         removing the token from the token bucket; and
         performing the new negotiation.

2. The method of claim 1, wherein the negotiation system comprises an Internet Key Exchange (IKE) daemon.

3. The method of claim 1, further comprising:
   performing the new negotiation if the negotiation system is determined not to be in congestion.

4. The method of claim 1, further comprising:
   adding the request for a new negotiation to a delay queue if a token is not available in the token bucket.

5. The method of claim 4, further comprising:
   processing a negotiation request in the delay queue if a token becomes available in the token bucket.

6. The method of claim 4, further comprising:
   dropping new negotiation requests.

7. The method of claim 1, further comprising:
   periodically adjusting a number of tokens in the token bucket.

8. The method of claim 7, wherein periodically adjusting further comprises:
   determining a maximum negotiation rate of the negotiation system; and
   adjusting the number of tokens in the token bucket based on the determined maximum negotiation rate of the negotiation system.

9. A negotiation system for reducing retransmission processing, comprising:
   a processing unit;
   an input/output interface for receiving a request for a new negotiation to be performed by the negotiation system; and
   a computer readable storage medium having stored therein instructions, the instructions, which are executable by the processing unit, comprising:
      instructions for determining if the negotiation system is in congestion;
      instructions for determining if a token is available in a token bucket if the negotiation system is determined to be in congestion;
      instructions for removing a token, if determined to be available, from the token bucket; and
      instructions for performing the new negotiation, wherein the new negotiation comprises a Security Association (SA) negotiation.

10. The system of claim 9, wherein the instructions comprise an Internet Key Exchange (IKE) daemon.

11. The system of claim 9, wherein the new negotiation is performed if the negotiation system is determined not to be in congestion.

12. The system of claim 9, further comprising:
    instructions for adding the request for a new negotiation to a delay queue if a token is not available in the token bucket.

13. The system of claim 12, further comprising:
    instructions for processing a negotiation request in the delay queue if a token becomes available in the token bucket.

14. The system of claim 9, further comprising:
    instructions for periodically adjusting a number of tokens in the token bucket.

15. The system of claim 14, wherein the instructions for periodically adjusting further comprises:
    instructions for determining a maximum negotiation rate of the negotiation system; and
    instructions for adjusting the number of tokens in the token bucket based on the determined maximum negotiation rate of the negotiation system.

16. A program product stored on a computer readable storage medium for reducing retransmission processing, the computer readable storage medium comprising program code for performing the steps of:
    receiving a request for a new negotiation to be performed by a negotiation system,
       wherein the negotiation comprises a Security Association (SA) negotiation;
    determining if the negotiation system is in congestion; and
    if the negotiation system is determined to be in congestion:
       determining if a token is available in a token bucket; and
    if a token is available in the token bucket:
    removing the token from the token bucket; and
    performing the new negotiation.

17. The program product of claim 16, further comprising program code for:
    adding the request for a new negotiation to a delay queue if a token is not available in the token bucket.

18. The program product of claim 17, further comprising:
    program code for processing a negotiation request in the delay queue if a token becomes available in the token bucket.

* * * * *